Jan. 29, 1929.                                          1,700,669
S. Z. DE FERRANTI
ELECTRICITY METER
Filed May 23, 1927          2 Sheets-Sheet 1

S.Z. de Ferranti
INVENTOR

By: Marks & Clerk
Attys.

Patented Jan. 29, 1929.

1,700,669

UNITED STATES PATENT OFFICE.

SEBASTIAN ZIANI DE FERRANTI, OF HOLLINWOOD, ENGLAND, ASSIGNOR TO FERRANTI, LIMITED, OF HOLLINWOOD, ENGLAND.

ELECTRICITY METER.

Application filed May 23, 1927, Serial No. 193,678, and in Great Britain July 12, 1926.

This invention relates to electricity meters and more particularly to the casings and covers thereof.

It is customary at present when constructing meters for use under conditions in which instances of attempted tampering with the meter, by firstly drilling the covers, are anticipated to provide glass covers for the meters which of course do not affect the reading after calibration and which can only be drilled with considerable difficulty. This measure, while effective to a certain extent, is not wholly satisfactory owing to the fact that such covers are easily breakable by deliberate act in the guise of an accidental act.

The object of the present invention is to provide improved constructions in which the possibility of tampering with the internal mechanism of the meter is entirely prevented or at least is rendered extremely remote, while at the same time the operation of the meter is the same with the cover in place as with it removed.

The invention consists in means for preventing fradulent tampering with an electricity meter in which the removable cover of the meter is formed of non-magnetic and undrillable metal.

The invention also consists in means for preventing fradulent tampering with an electricity meter in which the cover of the meter is formed of non-magnetic undrillable manganese steel.

The invention also consists in means for preventing fraudulent tampering with an electricity meter including a cover for the meter formed of non-magnetic undrillable cast iron, e. g. of composition 87 per cent cast iron, 9 per cent manganese and 4 per cent copper.

The invention also consists in means for preventing fraudulent tampering with an eletricity meter as set forth an any of the last three preceding paragraphs, wherein the cover or other unmachinable portion of the casing is provided with comparatively soft metal inserts, e. g. of mild steel, riveted into holes formed at any desired points.

The invention also consists in means for preventing fraudulent tampering with an electricity meter wherein the base which is machinable as a whole is hardened locally or is provided with a hard shield or shields, thus preventing fraudulent access.

The invention also consists in means for preventing fraudulent tampering with an electricity meter as set forth in the last preceding paragraph, wherein the base is formed of non-magnetic machinable cast iron.

The invention also consists in means for preventing fraudulent tampering with an electricity meter including a base of cast iron machinable as a whole but chilled locally for the purpose described.

The invention also consists in means for preventing fraudulent tampering with an electricity meter substantially as hereinafter described with reference to the accompanying drawings.

Referring to the accompanying diagrammatic drawings:—

Figure 3:
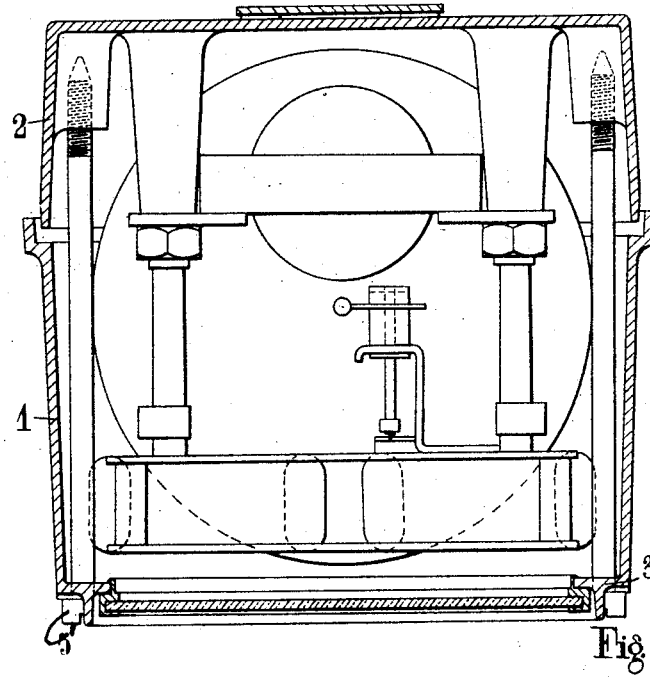
Figure 2:
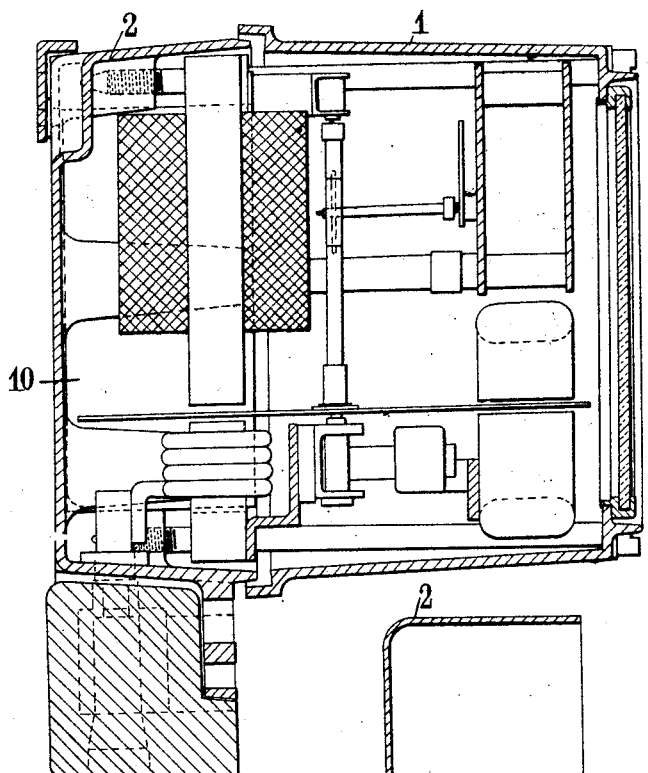
Figure 4:
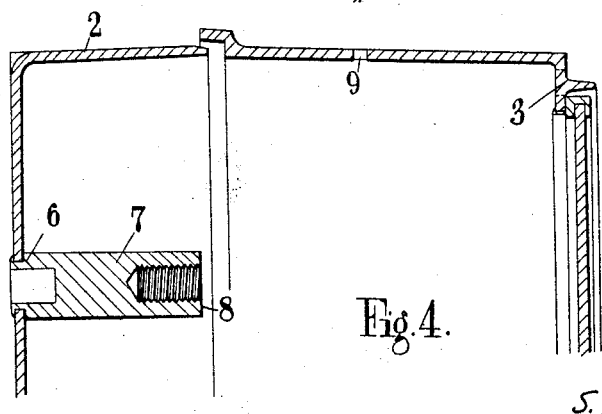

In carrying the invention into effect in one convenient example, I form the cover 1 (Figures 2, 3 and 4) of a meter casing (which is adapted to be removed during calibration of the meter) of non-magnetic unmachinable manganese steel.

By this means access to the internal mechanism of the meter by drilling the cover is prevented and moreover the calibration of the meter is not affected by the replacement of the cover.

According to a modification I form the cover of non-magnetic undrillable cast iron of constitution about 87 per cent cast iron, about 9 per cent manganese and about 4 per cent copper.

If holes be desired in this casing or if for example a portion requires to be screw-threaded for the reception of a screw 5 a hole 3 may be produced by punching (or by coring during casting) and if desired a plug of comparatively soft metal, such as mild steel, riveted in the hole. A further hole is shown at 9, Figure 4.

Figure 1:
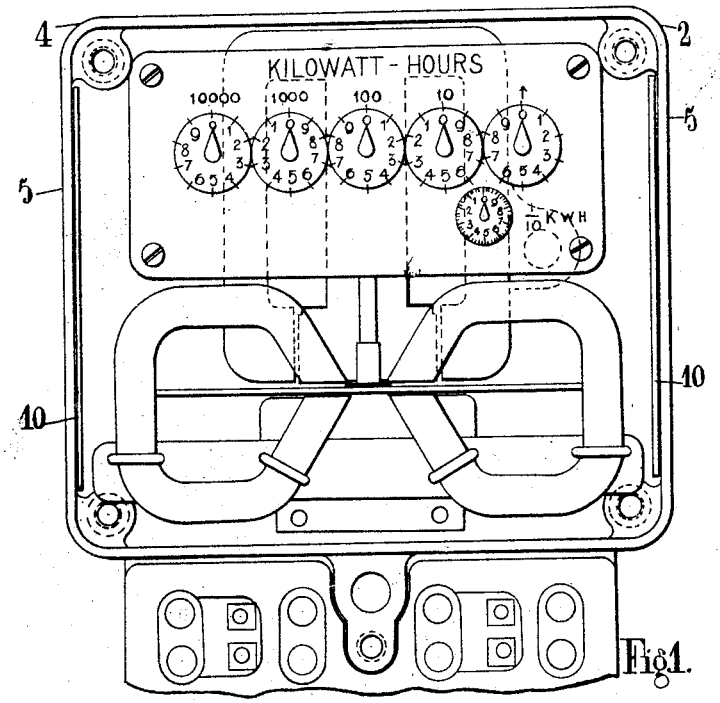
Figures 1, 2 and 3 are elevational and plan views of an electricity meter constructed in accordance with the present invention.

As regards the base portion 2 of the meter casing, (Figures 1, 2 and 3) this must be machinable as a whole so as to enable the meter mechanism to be secured readily thereto, but according to a feature of the present invention I form the base of machinable metal which is capable of being hardened locally at 4 and 5 (Figure 1) during casting, thus rendering it invulnerable at the desired regions without destroying its machinability as a whole. In some cases where appreciable leakage of the permanent magnet field through the base is possible, e. g. in certain direct current mercury meters, it may be preferred to employ non-magnetic machinable cast iron to constitute the base.

Figure 5:
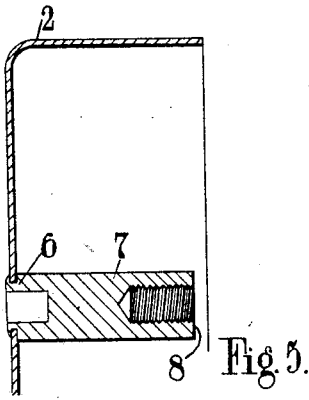
Figures 4 and 5 illustrate portions of a meter casing provided with machinable inserts.

According to another modification the base portion of the meter casing to which the principal working parts are fixed is made of non-magnetic undrillable cast iron alloy such as that described above in connection with the meter cover or a non-magnetic steel stamping such as ordinary manganese steel may be used. In the case of castings as above, holes 6 (Figure 4) may be cast in and blocks 7 of machinable metal riveted into position. In case of stampings, (such as 2, Figure 5) holes 6 may be punched in the material and blocks 7 of machinable metal riveted in where desired. In all cases the blocks riveted in are machined to have true faces 8 upon which to mount the working parts of the meter.

Instead of the above-described means of rendering the case invulnerable at the desired regions alternative means may be employed. This means comprises the provision within the base of a shield or shields 10 (Figures 1 and 2) of undrillable metal, e. g. manganese steel, these shields being so placed and secured as to prevent access to vulnerable parts of the meter mechanism should the base be drilled with this intention.

It should be understood that the terms "undrillable" and "unmachinable" employed above are comparative terms intended to indicate that such results are attainable only with very considerable difficulty.

Having now described my invention what I claim as new and desire to secure by Letters Patent is:—

1. Means for preventing fraudulent tampering with an electricity meter including a removable meter cover formed of non-magnetic and undrillable metal.

2. Means for preventing fraudulent tampering with an electricity meter including a removable meter cover formed of non-magnetic undrillable manganese steel.

3. Means for preventing fraudulent tampering with an electricity meter including a casing of which part is unmachinable and is provided with inserts of metal which is soft in comparison with the unmachinable part.

4. Means for preventing fraudulent tampering with an electricity meter mechanism contained in a base, which is machinable as a whole, said means comprising at least one locally hardened region.

5. Means for preventing fraudulent tampering with an electricity meter mechanism contained in a base, which is machinable as a whole, said means comprising at least one shield of undrillable metal.

6. Means for preventing fraudulent tampering with an electricity meter mechanism contained in a base of non-magnetic machinable cast iron, said means comprising at least one locally hardened region.

7. Means for preventing fraudulent tampering with an electricity meter mechanism contained in a base of non-magnetic machinable cast iron, said means comprising at least one shield of undrillable metal.

In testimony whereof I have signed my name to this specification.

SEBASTIAN ZIANI DE FERRANTI.